United States Patent Office 3,667,976
Patented June 6, 1972

3,667,976
COLORED CEMENT
Theodore F. Tanner, Houston, Tex., assignor to General Portland Cement Co., Dallas, Tex.
No Drawing. Filed June 30, 1970, Ser. No. 51,361
Int. Cl. C04b 7/10
U.S. Cl. 106—97                                                    17 Claims

ABSTRACT OF THE DISCLOSURE

Cement, and particularly portland cement, can be colored to a variety of different hues by admixing selected metals with the raw materials from which the cement is made prior to or during burning of the raw materials. The metals can be introduced in elemental or combined form. Generally, the metals are introduced in amounts from 0.2 to 2.0% by weight expressed as the oxide of the metal based on the total amount of dry raw materials which are introduced into the kiln. Burning temperatures at which the raw materials and coloring agent are reacted are conventional.

BACKGROUND OF THE INVENTION

Prior attempts have been made to produce colored cements. These cements are and have been useful in various applications in which an aesthetic effect is desired in the final concrete product made from the cement. The final product has been colored at the site at which the concrete is produced. This procedure, however, usually involves large quantities of pigments which can undesirably affect the final properties of the concrete product. Another attempt which has been made to color cement is to grind various pigmentations with clinker as it is ground. This latter method also requires a significant amount of pigment or additive. Additionally, it does not consistently produce a good colored cement product. The latter method also results in a mere additive color, which can be bleached or eroded upon exposure, rather than one brought about by chemical interaction with the cement constituents.

For example, U.S. Pat. 1,958,615 discloses a method for making colored cement by which clinker or ground cement is combined with a small quantity of sulfur and heated to about 800 to 1600° F. and maintained at that temperature for several hours out of contact with oxygen. Varying colors can be obtained by heating at preselected temperatures within the range for varying lengths of time. As is evident, however, this method requires an extra processing step and an extra heating steps, both of which take time and consume additional energy. U.S. Pat. 3,068,109 discloses another method for making colored cement, especially portland cement, by mixing with a cement-sand aggregate-water mixture a pozzolanic material which has been premixed with relatively small quantities of suitable mineral pigments. The pozzolanic material and mineral pigments are mixed with portland cement in ratios of 1:3 to 1:12, respectively. Here again, the average proportion of pigmentation to cement is quite high and can affect the hydraulic properties of the cement when intermixed with the final concrete composition.

Still another method for producing colored cements is disclosed in U.S. Pat. 1,829,082. This patent discloses mixing substances such as phosphates, borates or halogen compounds as a flux with the raw materials for making cement and further adding to the raw materials a metal compound such as the oxides of chromium, nickel, cobalt and copper. Specific examples are given. This disclosure states that metal complexes including borosilicates and metal sodium phosphates, for example, produce the color tendency in the final cement product.

It is desirable, however, to eliminate the need for additional processing steps as required by some of the foregoing prior methods for coloring cements. In addition, it is desirable to eliminate the need for addition of a plurality of ingredients to the raw materials to form a colored cement. It is further desirable to add a substance which will lend color to a cement by adding the substance to the raw materials or adding the substance at the burning zone of the kiln. Thus, if these desires can be achieved, the already long and costly process of producing cement will not be further complicated. It is also most desirable to obtain a cement product which has a specific, durable color imparted thereto.

SUMMARY OF THE INVENTION

In accord with the foregoing desired needs of the industry, this invention provides a process for making cement, including burning together finely divided argillaceous and calcareous material in a rotary kiln to produce a cement clinker, the improvement of coloring the cement clinker comprising burning with the argillaceous and calcareous materials a sufficient amount of coloring agent composed of a metal to color the cement. Preferably, these metals are selected from Groups IV-B, V-B and VII-B of the Periodic Table. Preferred metals are titanium, zirconium, manganese and vanadium.

DESCRIPTION OF PREFERRED EMBODIMENTS

In the typical cement making process, particularly a portland cement manufacturing process, ground argillaceous materials, calcareous materials and other minor proportion reactants are mixed and fed to an elongated rotary kiln, or other reaction system including a vertical kiln or a fluid bed type reactor or kiln. The ground argillaceous and calcareous materials are burned at temperatures ranging typically between 2600° F. and 2800° F. A chemical reaction takes place in the kiln between the argillaceous, calcareous and other reactants to produce a cement clinker primarily composed of tetracalciumaluminoferrate, tricalciumaluminate, tricalciumsilicate, and dicalciumsilicate. These products form what is called a cement clinker, which after cooling to ambient temperatures, is very finely ground with calcium sulfate to produce what is known as portland cement. The calcium sulfate is conventionally incorporated with the ground clinker to control setting time. The argillaceous materials are typically a clay or a clay-kaolin mixture. The calcareous materials are usually the calcite found in limestone. Additionally, other materials such as iron ore, slag or other additives are ground and mixed with the raw materials fed into the kiln.

It has been discovered that the addition of certain metals or metal compounds to the raw materials for the production of cement will produce a cement of predictable and desirable color and hue. It is to be understood that when the term metal or metal compound is used hereinafter that the metal can be in the elemental state, or can be in combined form such as an oxide or a mineral complex, or can be in ionic form. Generally, the metals can be added to the raw materials in amounts (expressed as the metal oxide) from about 0.2% to about 5.0%, preferably about 0.3% to about 2.0% and most preferably from about 0.4% to about 0.7% based on the total dry raw materials introduced into the kiln. It is to be understood that these ranges include amounts of metal naturally occurring in the cement raw materials as well as additional amounts mixed with the raw materials in accord with this invention. Going beyond the preferred limits, for example, below the lower limit of 0.2, will produce a cement which has a significant natural gray tone, but still slightly colored. Going above the upper limit of about 5% will produce a cement having the color characteristics of the particular metal added, however, the color additive will begin to affect the hydraulic properties of the cement. In addition, the color and hue and tone will begin to become somewhat muddy, i.e., it will begin to have an undesirable aesthetic quality. It is to be understood that when a percent of metal is utilized herein, it is expressed as a percentage by weight of the metal oxide, e.g., $TiO_2$, $ZrO_2$, $Mn_2O_3$ and $V_2O_5$, although the metal might be added in elemental, compound or mineral-complex form.

The percentage ranges expressed in the foregoing paragraph are based on total dry raw materials. These same ranges based on an analysis of cement clinker are, expressed as the oxide of the metal, from about 0.3% to about 8.0%, preferably about 0.5% to about 3.2%, and most preferably about 0.6% to about 1.0% by weight of the metal coloring agent in the final ground clinker.

The metals which have been discovered which will lend a desirable and predictable hue and color to a cement clinker are those which appear in Groups IV–B, V–B and VII–B of the Periodic Table as it appears at page B–2 of the 45th edition of the Handbook of Chemistry and Physics, Chemical Rubber Publishing Company, of Cleveland, Ohio (1964). Preferred among these metals are titanium, zirconium, manganese and vanadium. Addition of titanium to the raw materials will produce a cement clinker which has a buff color, that is, it will produce a yellowish hue in the final cement clinker. Addition of manganese to the raw materials will produce a clinker with a definite blue tone. Addition of vanadium will produce a silver-gray bordering on a green tone. Zirconium will again produce a buff colored cement clinker.

It has been found that the color and hue is somewhat dependent upon the reaction or burning temperatures. For example, when titanium is mixed with raw materials, a reaction temperature of between 2500 and 2700° F. will produce a grayish buff or grayish yellow cement clinker. However, when the reaction temperature ranges between 2700° F. and 3000° F., a definite buff tone and very desirable hue will be present. Preferred percentages of titanium to be added to the raw materials, based on the dry weight of the raw materials, ranges between 0.3% by weight (expressed as titanium dioxide) to about 2.0% by weight. The most preferred burning zone temperatures or reaction temperatures range between about 2650° F. to 3000° F.

Additionally, it has been found that quenching the clinker produced by adding the metals set forth above will additionally fix and produce a brighter hue of the same tone as is produced by merely adding the metal alone. Quenching can be accomplished by an air blast upon the hot clinker as it leaves the kiln, or can be accomplished by other quenching media such as steam or water. Normally, clinker will cool to ambient temperature in about 10 to more than 20 minutes. If the clinker is quenched from its burning temperature of around 2700° F. to near room temperature in about half that time, that is, from 5 to 12 or so minutes, the clinker will take on a very definite bright, aesthetically desirable hue and color characteristic of the metal which has been added to the raw materials. As a general guideline, the desirable quality contributed by quenching will occur if the clinker is cooled about 1.5 or more times faster than occurs in conventional production. Generally, quenching in a time span of about 25% to 75% of that which the clinker normally takes to cool to room temperature will produce the desirable increase in hue and color fixation.

EXAMPLES

The following examples are presented as guidelines for those of ordinary skill in the art to reproduce the present invention. Included among the examples are preferred embodiments of the invention. These examples are intended as exemplifications only and are not intended to be delimitative of the invention in any manner. All percentages used herein are by weight unless otherwise stated. All formulations in the following examples are intended to produce a "Type I" general purpose portland cement which has the color, tone and hue characteristic of the metal which has been added, although the coloring mechanism will be equally effective with other cement formulations.

EXAMPLE I

A cement raw material mix of the following chemical composition is prepared using a mixture of limestone, clay and iron ore.

TABLE I

Basic raw mix for Example I

| Composition: | Percent by weight |
| --- | --- |
| $SiO_2$ | 14.0 |
| $Al_2O_3$ | 3.6 |
| $Fe_2O_3$ | 1.7 |
| CaO | 41.2 |
| Loss on ignition | 37.0 |

The foregoing mixture is altered by varying the addition of limestone and ilmenite. (Ilmenite is a mineral complex of the formula $TiO_2 \cdot FeO$. The ilmenite utilized in this particular example is obtained from Australia in a re-processed ore form containing about 50% $TiO_2$ by weight. The ore can be purchased as ilmenite concentrates from Frank Samuels and Company, King of Prussia, Pennsylvania.) In this way 1,000 grams of seven different raw mixes are prepared. They are set forth in Table II.

TABLE II.—RAW MIXES WITH Ti VARIED

| | Samples (weight percent) | | | | | | |
| --- | --- | --- | --- | --- | --- | --- | --- |
| | 1 | 2 | 3 | 4 | 5 | 6 | 7 |
| Composition: | | | | | | | |
| $SiO_2$ | 14.0 | 14.0 | 14.0 | 13.9 | 13.8 | 14.0 | 13.7 |
| $Al_2O_3$ | 3.6 | 3.6 | 3.6 | 3.6 | 3.6 | 3.5 | 3.5 |
| $Fe_2O_3$ | 1.7 | 1.7 | 1.7 | 1.7 | 1.7 | 1.7 | 1.7 |
| CaO | 41.2 | 41.2 | 41.1 | 41.0 | 41.4 | 41.0 | 41.1 |
| Loss on ignition | 37.0 | 37.0 | 37.0 | 36.5 | 36.7 | 37.1 | 37.0 |
| Composition $TiO_2$ | 0.0 | 0.1 | 0.5 | 0.75 | 1.0 | 2.0 | 3.0 |

About 100 grams of each of the raw mixes is pellitized. 20 gram portions from each of these 100 gram samples are separately burned in an electric furnace for 20 minutes at temperatures varying from 2500° F. to 3000° F. After burning for 20 minutes, the samples are removed at once from the furnace and allowed to cool by normal radiation and convection to room temperature. The samples are ground with mortar and pestel and visually compared for color. The results are set forth in Table III, using the following color code: G, gray; GY, gray with yellow trace; B, good buff hue; B/M, buff tone which is slightly muddy.

TABLE III.—COLOR RESULTS FROM EXAMPLE I

| | Sample Number | | | | | | |
| --- | --- | --- | --- | --- | --- | --- | --- |
| Temperature, °F. | 1 | 2 | 3 | 4 | 5 | 6 | 7 |
| 2,500 | G | GY | GY | GY | GY | GY | GY |
| 2,600 | G | GY | GY | GY | GY | GY | GY |
| 2,700 | G | GY | B | B | B | B/M | B/M |
| 2,750 | G | GY | B | B | B | B/M | B/M |
| 2,800 | G | GY | B | B | B | B/M | B/M |
| 2,900 | G | GY | B | B | B | B/M | B/M |
| 3,000 | G | GY | B | B | B | B/M | B/M |

The procedure of Example I is repeated using rutile and purified titanium dioxide, rather than ilmenite. The results are substantially the same.

EXAMPLE II

A cement raw mix weighing 175 pounds was prepared using a mixture of limestone, clay, iron ore and ilmenite ore. The chemical composition of the cement raw mix is set forth in Table IV.

TABLE IV

Cement raw mix for Example II

| Composition: | Percent by weight |
| --- | --- |
| $SiO_2$ | 13.4 |
| $Al_2O_3$ | 3.7 |
| $Fe_2O_3$ | 2.2 |
| CaO | 42.3 |
| MgO | 1.4 |
| Loss on ignition | 35.2 |
| $TiO_2$ | 1.2 |

The raw mix is pellitized and burned in a 5" x 14" x 10' long laboratory rotary kiln. Samples of the clinker are taken and visually checked for color. The color is recorded at 30 minute intervals. In addition, the temperature of the kiln burning zone is taken and recorded at one hour intervals. The run was continued for about 7 hours. The results are set forth in Table V.

TABLE V.—COLOR RESULTS OF EXAMPLE II

| | Clinker | | |
| --- | --- | --- | --- |
| Hour: | Production rate, lb./hr. | Temperature leaving burning zone, °F. | Color |
| 1 | | 2,700 | Buff. |
| 2 | 4.60 | 2,630 | Do. |
| 3 | 6.44 | 2,590 | Yellow-gray. |
| 4 | 4.27 | 2,640 | Buff. |
| 5 | 4.60 | 2,640 | Do. |
| 6 | 5.10 | 2,645 | Do. |
| 7 | 4.84 | 2,620 | Do. |

As can be seen from the foregoing data, when the burning temperature reaches a point below 2600° F., the clinker retains some of its natural gray tone. When the temperature is above 2600° F., a good quality buff clinker is produced.

EXAMPLE III

Approximately 100 grams of cement raw mix is prepared using a mixture of limestone, clay and iron ore. Three 20 gram samples are taken of this cement raw mix. To the first sample is added a manganese salt, to the second sample is added vanadium salt and to the third sample is added zirconium salt. The chemical composition of the three cement raw mixes is set forth in Table VI.

TABLE VI.—RAW MIX ANALYSES, EXAMPLE III

| | Sample (weight percent) | | |
| --- | --- | --- | --- |
| | 1 | 2 | 3 |
| Composition: | | | |
| $SiO_2$ | 13.3 | 13.3 | 13.3 |
| $Al_2O_3$ | 3.7 | 3.7 | 3.7 |
| $Fe_2O_3$ | 2.2 | 2.2 | 2.2 |
| CaO | 41.7 | 41.7 | 41.7 |
| MgO | 1.5 | 1.5 | 1.5 |
| Ignition loss | 36.4 | 36.4 | 36.4 |
| Composition: | | | |
| $V_2O_5$ | | 2.0 | |
| $Mn_2O_3$ | 2.0 | | |
| $ZrO_2$ | | | 2.0 |

Each of the three samples are pellitized and burned in an electric furnace for about 20 minutes at 2750° F. Immediately after the burn, the clinker samples thus formed are removed from the furnace and allowed to cool by natural convection and radiation to room temperature. The clinker is then ground with a mortar and pestel. The sample 1 to which manganese is added has a definite blue tone. The sample to which vanadium is added has a silver-gray to green tone. The sample to which zirconium is added has a definite buff color comparable to that obtained above with titanium.

EXAMPLE IV

A procedure similar to that of Example I is repeated varying the equivalent percent of titanium added to a cement raw mix for production of a type I portland cement. Two samples are burned at 2750° F. for about 20 minutes in an electric furnace after which they are removed and allowed to naturally cool to room temperature. Each of the two samples containing the titanium metal produced a buff color and hue. The first sample contained 0.1% titanium dioxide. The second sample contained 5.0% titanium dioxide.

EXAMPLE V

Five samples of a cement raw mix weighing about 100 pounds are prepared using a mixture of limestone, clay, iron ore and ilmenite ore. The five samples are individually pellitized and burned in a 5" x 14" x 10' long laboratory rotary kiln. Immediately upon being discharged from the kiln, the clinker is quenched in water. Thereafter, the clinker is dried and ground. Clinker analyses for the five samples are set forth in Table VII.

TABLE VII.—CLINKER ANALYSIS FOR EXAMPLE V

| | Sample No. (percent by weight) | | | | |
| --- | --- | --- | --- | --- | --- |
| | 1 | 2 | 3 | 4 | 5 |
| Composition: | | | | | |
| $SiO_2$ | 22.3 | 21.7 | 21.5 | 21.5 | 20.8 |
| $Al_2O_3$ | 5.6 | 6.0 | 5.6 | 5.5 | 5.3 |
| $Fe_2O_3$ | 2.6 | 2.8 | 2.7 | 2.7 | 2.7 |
| CaO | 66.0 | 66.5 | 65.7 | 66.7 | 66.5 |
| MgO | 2.6 | 2.8 | 2.5 | 2.6 | 2.6 |
| $TiO_2$ | 0.3 | 0.5 | 0.8 | 1.1 | 2.8 |

The color of the ground clinker with varying percentages of titanium in the clinker is set forth in Table VIII.

TABLE VIII.—COLOR OF GROUND CLINKER

| Sample Number: | $TiO_2$ (percent by weight) | Color |
| --- | --- | --- |
| 1 | .3 | Light gray, yellow tint. |
| 2 | 0.5 | Light yellow. |
| 3 | 0.8 | Buff, very slight red trace. |
| 4 | 1.1 | Buff. |
| 5 | 2.8 | Do. |

As is observed, the color obtained is yellowish and with $TiO_2$ content of 0.5% by weight and, above the color obtained is definitely a yellow to buff tone. The color obtained upon quenching is brighter and more intense than that obtained when the clinker is cooled to room temperature in a laboratory tray exposed to the atmosphere.

From the foregoing examples, it can be seen that the addition of metals to a raw cement mix will give a definite color to the final clinker. It can also be seen that the color is characteristic of the particular metallic element or compound which is added to the raw mix. It is to be understood that the metal, whether elemental, an oxide or a mineral complex, can be added to the kiln with the raw material in the feed end or to the burning zone, for example, by insufflation. The metal can also be added intermediate the feed end and the burning zone by a suitable mechanism, for example, a scoop feeder, or if desired at any point upstream of the feed end, including during initial grinding of reactant materials or into a preheating system.

The role which the metals assume to provide color in the cement composition is not completely understood. One theory is that, for example, the titanium is in some way combined with the ferrite phase of the clinker and that the aluminate/ferrite molar ratio must be greater than one in order to give the clinker a buff color. For example, if no titanium is present in the cement raw mix and the final clinker has an aluminate to ferrite ratio less than one, the color of the clinker is gray. The clinker is white if the ferrite phase is not present and if titanium is present. The color, however, returns to gray when the ferrite phase is present and the aluminate to ferrite phase is less than one. When, however, the titanium is present and the aluminate-ferrite ratio is greater than one, the color of the cement clinker becomes buff. It is, therefore, believed that the color tendency is somehow interrelated and connected with the ferrite phase. Therefore, if the aluminate to ferrite ratio is greater than one in the presence of a metal, the cement clinker will exhibit the characteristic color and hue of the particular metal.

The utility of the foregoing invention is apparent to those of ordinary skill in the art. Its utility is especially apparent to those in the business of manufacturing portland cement due to the large demand for cements of buff and other colors. Although the foregoing specification has set forth this invention in relation to preferred embodiments, other variations, alterations and equivalent formulations and compositions will be apparent to those of ordinary skill. The invention is not intended to be limited in any manner by the foregoing description except as defined by the appended claims.

What is claimed is:

1. In a method for producing portland cement including the steps of:
    introducing argillaceous and calcareous reactant materials to a feed end of a kiln,
    burning the reactant materials in a burning zone in the kiln to produce a cement clinker,
    grinding the clinker to produce a powdered hydraulic cement, the improvement comprising:
    coloring the cement clinker by adding to the reactant materials no later than when they are burned an oxide of a metal selected from Groups IV-B, V-B, and VII-B of the Periodic Table in an amount in the range of from 0.2 to 5 weight percent of said argillaceous and calcareous reactant materials to color the cement product, and thereafter rapidly quenching said clinker after it has been burned.

2. The method of claim 1 wherein the metal oxide is introduced into the kiln along with the argillaceous and calcareous materials.

3. The method of claim 1 wherein the metal oxide is introduced into the kiln intermediate the feed end and the burning zone.

4. The method of claim 1 wherein the metal oxide is introduced into the burning zone as the said materials are being burned.

5. The method of claim 1 wherein said metal oxide is an oxide of a metal selected from vanadium, zirconium, manganese and titanium.

6. The method of claim 5 wherein the metal oxide is $TiO_2$.

7. The method of claim 6 wherein the titanium oxide is added in the form of ilmenite.

8. The method of claim 1 wherein the quenching rate is at least about 1.5 times the normal cooling rate.

9. The method of claim 8 wherein the clinker is quenched with water.

10. The cement composition produced by the process of claim 1 and containing said metal oxide in amounts from about 0.3 to about 8% by weight thereof.

11. The cement composition produced by the method of claim 10 wherein said metal oxide is titanium dioxide and said cement has a buff color.

12. The method of claim 1 wherein said metal oxide is added in amounts from about 0.3 to about 2% by weight of said argillaceous and calcareous reactant materials.

13. The cement composition produced by the method of claim 12 which contains from about 0.5 to about 3.2% by weight of said metal oxide.

14. The cement composition of claim 13 wherein said metal oxide is titanium dioxide and said cement has a buff color.

15. The method of claim 1 wherein said metal oxide is added in amounts of from about 0.4% to about 0.7% by weight of said argillaceous and calcareous reactant materials.

16. The cement composition produced by the process of claim 15 and which contains from about 0.6% to about 1% by weight of said metal oxide.

17. The cement composition of claim 16 wherein said metal oxide is titanium dioxide and said cement has a buff color.

References Cited

UNITED STATES PATENTS

| | | | |
|---|---|---|---|
| 3,074,705 | 1/1963 | Dano et al. | 106—101 |
| 1,829,082 | 10/1931 | Bergen et al. | 106—106 |

FOREIGN PATENTS

| | | | |
|---|---|---|---|
| 1,000,124 | 11/1949 | Belgium | 106—101 |
| 505,406 | 9/1951 | Belgium | 106—101 |

OTHER REFERENCES

Lea & Desch, "The Chemistry of Cement and Concrete," Edward Arnold & Sons, pp. 76 and 77 (1956).

TOBIAS E. LEVOW, Primary Examiner
W. T. SCOTT, Assistant Examiner

U.S. Cl. X.R.
106—89, 101

UNITED STATES PATENT OFFICE
CERTIFICATE OF CORRECTION

Patent No. 3,667,976            Dated June 6, 1972

Inventor(s) Theodore F. Tanner

It is certified that error appears in the above-identified patent and that said Letters Patent are hereby corrected as shown below:

Claim 7 should depend from Claim 6.

Signed and sealed this 24th day of October 1972.

(SEAL)
Attest:

EDWARD M. FLETCHER, JR.            ROBERT GOTTSCHALK
Attesting Officer                     Commissioner of Patents